(12) United States Patent
Egawa

(10) Patent No.: US 8,038,305 B2
(45) Date of Patent: Oct. 18, 2011

(54) LIGHT SOURCE UNIT, ILLUMINATION DEVICE, IMAGE DISPLAY APPARATUS, AND MONITOR APPARATUS

(75) Inventor: Akira Egawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 595 days.

(21) Appl. No.: 12/015,816

(22) Filed: Jan. 17, 2008

(65) Prior Publication Data

US 2008/0186554 A1   Aug. 7, 2008

(30) Foreign Application Priority Data

Feb. 7, 2007   (JP) ................................. 2007-027649
Oct. 24, 2007  (JP) ................................. 2007-276054

(51) Int. Cl.
*G02B 26/08* (2006.01)
*H01S 3/108* (2006.01)

(52) U.S. Cl. ......... 353/81; 353/98; 359/223.1; 359/328; 372/22; 372/108; 362/259

(58) Field of Classification Search .................... 353/81, 353/98; 372/19, 20, 21, 22, 24, 108; 362/259, 362/277; 359/222.1, 223.1, 326, 328, 329
See application file for complete search history.

(56) References Cited

U.S. PATENT DOCUMENTS

| | | | |
|---|---|---|---|
| 5,247,528 A * | 9/1993 | Shinozaki et al. | 372/22 |
| 5,353,149 A * | 10/1994 | Urakami et al. | 359/326 |
| 5,390,210 A * | 2/1995 | Fouquet et al. | 372/92 |
| 5,410,561 A * | 4/1995 | Ogawa | 372/22 |
| 7,457,030 B2 * | 11/2008 | Okuno et al. | 359/326 |
| 2003/0112492 A1 * | 6/2003 | Huang | 359/321 |
| 2004/0228372 A1 * | 11/2004 | Vodopyanov et al. | 372/21 |
| 2005/0008046 A1 * | 1/2005 | Vodopyanov et al. | 372/21 |
| 2006/0088259 A1 * | 4/2006 | Weiner | 385/122 |
| 2006/0159139 A1 * | 7/2006 | Hu et al. | 372/26 |
| 2007/0041421 A1 * | 2/2007 | Duncan et al. | 372/106 |
| 2007/0253453 A1 * | 11/2007 | Essaian et al. | 372/22 |
| 2008/0008431 A1 * | 1/2008 | Shikii et al. | 385/115 |
| 2008/0080185 A1 * | 4/2008 | Kumagai et al. | 362/259 |
| 2008/0175282 A1 * | 7/2008 | Okuno et al. | 372/21 |
| 2008/0186554 A1 * | 8/2008 | Egawa | 359/223 |
| 2008/0259436 A1 * | 10/2008 | Kamijima | 359/326 |
| 2008/0259969 A1 * | 10/2008 | Piper et al. | 372/3 |
| 2009/0010001 A1 * | 1/2009 | Kamijima et al. | 362/259 |
| 2009/0041067 A1 * | 2/2009 | Meissner et al. | 372/22 |
| 2009/0046749 A1 * | 2/2009 | Mizuuchi | 372/22 |
| 2009/0110013 A1 * | 4/2009 | Gollier et al. | 372/22 |
| 2009/0279017 A1 * | 11/2009 | Furuya et al. | 349/61 |
| 2010/0014543 A1 * | 1/2010 | Ogilvy et al. | 372/19 |

FOREIGN PATENT DOCUMENTS

| | | | |
|---|---|---|---|
| JP | A 2000-250082 | | 9/2000 |
| JP | 2005-221807 | * | 8/2005 |
| WO | WO 2005076066 A1 | * | 8/2005 |

* cited by examiner

*Primary Examiner* — John Lee
(74) *Attorney, Agent, or Firm* — Oliff & Berridge PLC

(57) ABSTRACT

A light source unit includes: a light source part that supplies light; an optical element that changes an optical path of the light from the light source part; and a wavelength conversion element that converts a wavelength of the light from the optical element. The optical element is movable, and the optical path of the light entering the wavelength conversion element from the light source part is shifted by moving the optical element.

16 Claims, 12 Drawing Sheets

LIGHT SOURCE UNIT, ILLUMINATION DEVICE, IMAGE DISPLAY APPARATUS, AND MONITOR APPARATUS

BACKGROUND

1. Technical Field

The present invention relates to a light source unit, an illumination device, an image display apparatus, and a monitor apparatus, and specifically, to a laser light source unit technology of supplying laser light.

2. Related Art

Recently, as a light source unit for a projector, a technology using a laser light source that supplies laser light has been proposed. As a laser light source, not only one that directly supplies fundamental wave light from a light emitting part but also one that converts the wavelength of the fundamental wave light and supplies it is known. As a wavelength conversion element that converts the wavelength of fundamental wave light, for example, a second-harmonic generation (SHG) element is used. As the SHG element, for example, a nonlinear optical crystal is used. Within the nonlinear optical crystal that performs second harmonic generation, nonlinearly-polarized wave and SHG wave propagate because of nonlinear polarization induced by a strong photoelectric field. The SHG element can generate SHG wave efficiently when the phase matching condition depending on generation wavelength or the like is satisfied. Phase matching refers to matching of phases between the nonlinearly-polarized wave and SHG wave. Phase matching includes angular phase matching of entering the fundamental wave at an incident angle at which the refractive index at the wavelength of the fundamental wave and the refractive index at the wavelength of the SHG wave are equal, for example. In a related art, a technology of adjusting the phase matching angle has been proposed for efficient SHG wave generation (e.g., see JP-A-2000-250082). The phase matching angle refers to the incident angle of the fundamental wave that satisfies the phase matching condition.

SUMMARY

In order to satisfy the phase matching condition, a wavelength conversion device using quasi phase matching (QPM) has been developed in the related art. As the QPM wavelength conversion device, a polarization-reversed crystal formed by periodically reversing the spontaneous polarization of a nonlinear optical crystal may be used. In the case of a method of manufacturing the polarization-reversed crystal in the related art, it has been difficult to form a homogeneous periodic structure of the polarization-reversed crystal with respect to the thickness direction of the optical crystal. When the periodic structure of the polarization inversion crystal is inhomogeneous, there may be a difference in wavelength conversion efficiency within the optical crystal face. When there is a difference in wavelength conversion efficiency within the optical crystal face, a problem that it is difficult to obtain high wavelength conversion efficiency only by the adjustment of the phase matching angle arises.

An advantage of some aspects of the invention is to provide a light source unit that can supply laser light with high efficiency because of high wavelength conversion efficiency, and an illumination device, an image display apparatus, and a monitor apparatus using the light source unit.

According to an aspect of the invention, there is provided a light source unit including: a light source part that supplies light; an optical element that changes an optical path of the light from the light source part; and a wavelength conversion element that converts a wavelength of the light from the optical element, wherein the optical element is movable, and the optical path of the light entering the wavelength conversion element from the light source part is shifted by moving the optical element can be provided.

By shifting the optical path of the light entering the wavelength conversion element, the light can be entered into the position where the highest wavelength conversion efficiency is provided within the optical crystal face. By entering the light into the position where the highest wavelength conversion efficiency, laser light can be supplied with high efficiency because of the high wavelength conversion efficiency. Thereby, the light source unit that can supply laser light with high efficiency because of the high wavelength conversion efficiency is obtained. The configuration that the optical path of the light from the light source part is shifted by moving the optical element enables easy adjustment of the incident position of the light to the wavelength conversion element. The phrasing that the optical element is movable contains that the element was movable in the manufacturing of the light source unit, and it does not necessarily imply that the optical element is movable after adjustment of the optical element position or in the light source unit in which the optical element position has been fixed.

It is preferable that the optical element reflects the light from the light source part. The bending of light by the optical element enables change of the optical path of the light from the light source part. Further, the optical path of the light from the light source part can be shifted easily by moving the optical element.

It is preferable that the optical element includes a prism. In the case of using the prism, the optical path of the light from the light source part can be changed by the reflection on the reflection film or the total reflection at the interface. Further, the optical path of the light from the light source part can be easily shifted with high accuracy using the prism that can be stably provided.

It is preferable that the unit includes an external resonator that transmits light at a specific wavelength wavelength-converted by the wavelength conversion element, and reflects lights at wavelengths other than the specific wavelength and resonates the lights between the light source part and itself, and the wavelength conversion element and the external resonator are provided movably in conjunction with the movement of the optical element. By moving the wavelength conversion element and the external resonator in conjunction with the movement of the optical element, the optical path length between the light source part and the external resonator can be fixed and the optical path of the light from the light source part can be shifted. Thereby, the configuration that can suppress the reduction in wavelength conversion efficiency and shift the light from the light source part can be realized.

It is preferable that the wavelength conversion element and the external resonator are provided on the same member. Thereby, the wavelength conversion element and the external resonator can be moved in conjunction with the movement of the optical element.

It is preferable that the optical element includes a first optical element that shifts the optical path of the light from the light source part in the first direction, and a second that shifts the optical path of the light from the light source part in the second direction nearly perpendicular to the first direction. Thereby, the light from the light source part can be entered into the position where the highest wavelength conversion efficiency is provided within the surface along the first direction and the second direction.

It is preferable that the unit includes an optical element support that supports the optical element. By providing the optical element support, position adjustment of the optical element can be performed via the optical element support. Thereby, the position adjustment of the optical element can be easily performed.

It is preferable that the unit includes a substrate on which the light source part, the optical element support, and the wavelength conversion element are provided, and the substrate has a guide that guides the optical element support in a specific direction. Thereby, the optical element can be easily moved while reliably keeping the parallelism of the light source part and the optical element.

It is preferable that the guide includes a concaved shape into which the optical element support can be inserted. Thereby, the optical element support can be guided.

It is preferable that the guide includes a convex shape that can be brought into contact with the optical element support. Thereby, the optical element support can be guided.

Further, according to another aspect of the invention, there is provided an illumination device including the above described light source unit, wherein an illuminated subject is illuminated using light from the light source unit can be provided. Using the above described light source unit, laser light can be supplied with high efficiency because of the high wavelength conversion efficiency. Thereby, the illumination device that can supply laser light with high efficiency is obtained.

Furthermore, according to yet another aspect of the invention, there is provided an image display apparatus including the above described light source unit, wherein an image is displayed using light from the light source unit can be provided. Using the above described light source unit, light can be supplied with high efficiency because of the high wavelength conversion efficiency. Thereby, the image display apparatus that can display bright images with high efficiency is obtained.

Moreover, according to still another aspect of the invention, there is provided a monitor apparatus including: the above described illumination device; and an imaging unit that images a subject illuminated by the illumination device can be provided. Using the above described illumination device, light can be supplied with high efficiency. Thereby, the monitor apparatus that can monitor bright images with high efficiency is obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described in detail with reference to the drawings.

Embodiment 1

Figure 1:
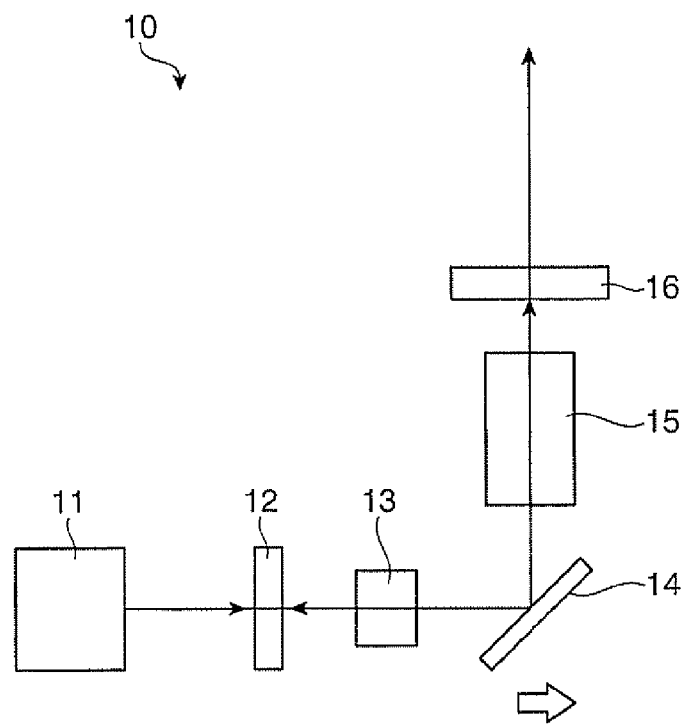
FIG. 1 shows a schematic configuration of a light source unit according to embodiment 1 of the invention.

FIG. 1 shows a schematic configuration of a light source unit 10 according to embodiment 1 of the invention. The light source unit 10 is a diode pumped solid state (DPSS) laser oscillator. The light source unit 10 has a resonator structure using a first resonant mirror 12 and a second resonant mirror 16. A semiconductor element 11 is an edge emitting semiconductor element that supplies light having a wavelength of 808 nm, for example. The light from the semiconductor element 11 passes through the first resonant mirror 12, and then, enters a laser crystal 13. As the laser crystal 13, for example, Nd:YVO$_4$ crystal or Nd:YAG (Y$_3$Al$_5$O$_{12}$) crystal is used. The laser crystal 13 supplies fundamental wave light having a wavelength of 1064 nm, for example, when pumped. The semiconductor element 11 and the laser crystal 13 configure a light source part that supplies fundamental wave light.

A reflection mirror 14 is provided at the opposite side to the first resonant mirror 12 with respect to the laser crystal 13. The reflection mirror 14 is an optical element that reflects the light from the semiconductor element 11. The reflection mirror 14 is configured by forming a reflection film on a parallel plate. The reflection mirror 14 bends the optical path of the light from the laser crystal 13 nearly at a right angle to change the optical path of the laser light from the light source part. An SHG element 15 is provided at the location where the light that has passed through the laser crystal 13 and the reflection mirror 14 enters.

The SHG element 15 is a wavelength conversion element that converts the wavelength of the light from the reflection mirror 14. The SHG element 15 converts the fundamental wave light from the reflection mirror 14 into harmonic wave light having the half wavelength and outputs it. As the SHG element 15, for example, a nonlinear optical crystal may be used. As the nonlinear optical crystal, for example, a polarization-reversed crystal of lithium niobate (LiNbO$_3$) (periodically poled lithium niobate; PPLN) may be used.

Figure 2:
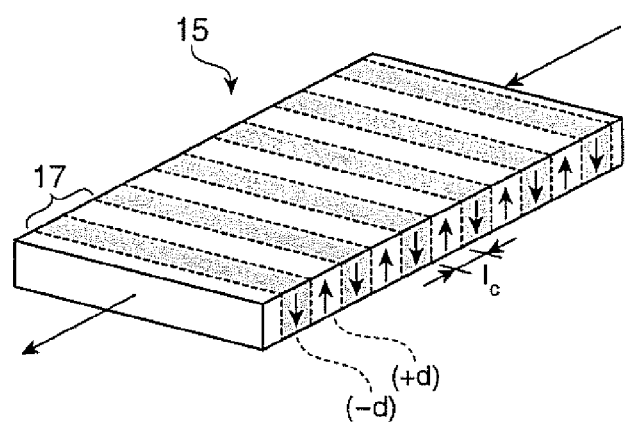
FIG. 2 is a diagram for explanation of polarization-reversed structures of an SHG element.

FIG. 2 is a diagram for explanation of polarization-reversed structures 17 of the SHG element 15. The SHG element 15 includes the periodically arranged polarization-reversed structures 17. The polarization-reversed structure 17 is configured by reversing the sign of nonlinear optical constant d for each coherent length $l_c$. For formation of the polarization-reversed structure 17, a method of applying a voltage to an optical crystal is often used. For example, the polarization-reversed structure 17 may be obtained by forming a minute insulating layer pattern on a lithium niobate (LN) substrate having a spontaneous polarization, and applying a voltage via a metal film or electrolyte.

Returning to FIG. 1, the second resonant mirror 16 is provided at the opposite side to the reflection mirror 14 with respect to the SHG element 15. The SHG element 15 converts fundamental wave light having a wavelength of 1064 nm into harmonic wave light at 532 nm, for example. The second resonant mirror 16 has a function of selectively reflecting the light at 1064 nm, for example, and transmitting lights at other wavelengths. The light converted by the SHG element 15 at a specific wavelength, for example, 532 nm passes through the second resonant mirror 16 and exits from the light source unit 10. The lights at wavelengths other than the specific wavelength are reflected by the second resonant mirror 16. The first resonant mirror 12 selectively reflects light at 1064 nm, for example, and transmits lights at other wavelengths like the second resonant mirror 16. Because of the resonator structure, the laser light at a specific wavelength can be efficiently output.

The semiconductor element 11 may be the edge emitting semiconductor element or a surface emitting semiconductor element. The light source unit 10 is not limited to the DPSS laser oscillator. The unit may be a light source unit that enters the light from the semiconductor element 11 as the light source part into the wavelength conversion element. The light source unit 10 may use the semiconductor element, or a solid laser, liquid laser, gas laser, or the like.

Figure 3:
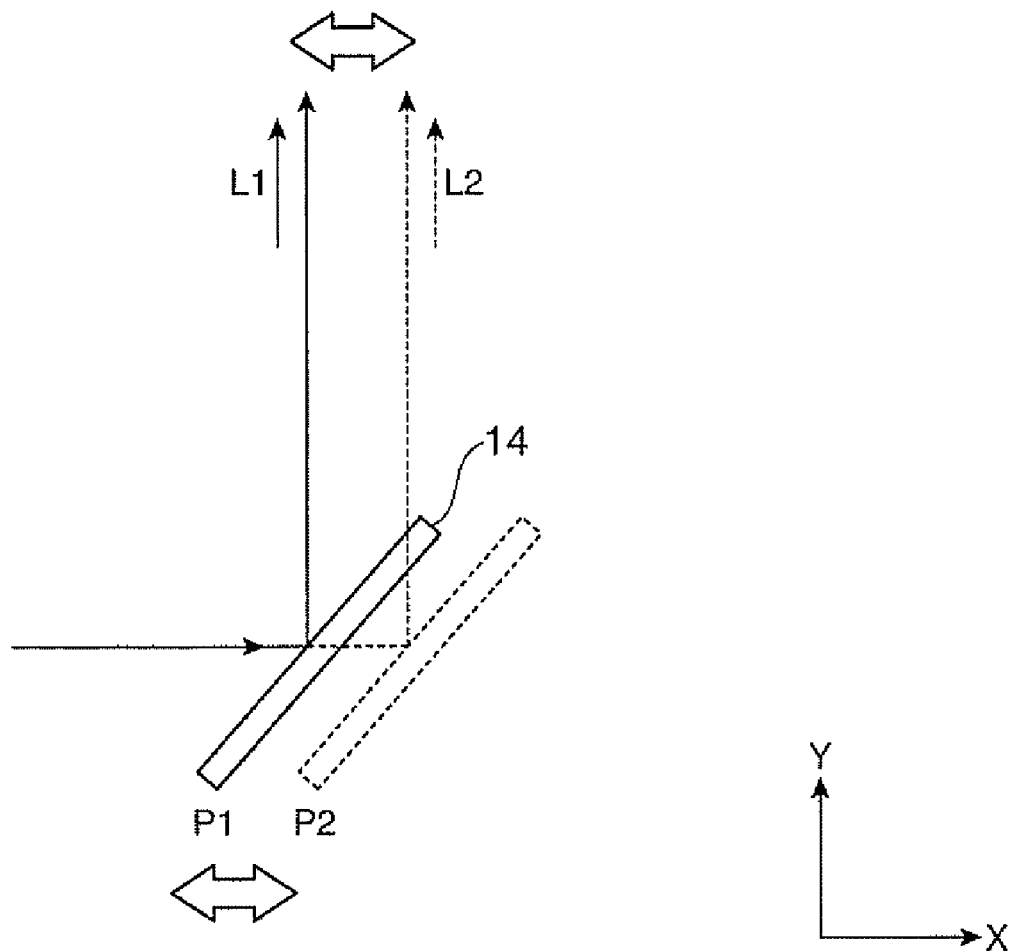
FIG. 3 is a diagram for explanation of shifting of optical path of the light from a semiconductor element.

FIG. 3 is a diagram for explanation of shifting of optical path of the light from the semiconductor element 11. The X-direction is a direction in which the light entering the reflection mirror 14 from the laser crystal 13 (see FIG. 1) travels. In the manufacturing process of the light source unit 10, the reflection mirror 14 is configured to be movable with respect to the X-direction. The reflection mirror 14 can be moved, for example, manually or using an adjustment jig or the like used in a related art. Here, the case where the reflection mirror 14 is moved with respect to the X-direction from position P1 (a position of solid line in FIG. 3) to position P2 (a position of broken line in FIG. 3) is considered. When the reflection mirror 14 is in the position P1, the optical path of the light reflected by the reflection mirror 14 is optical path L1 in FIG. 3. On the other hand, when the reflection mirror 14 is moved to the position P2, the optical path of the light reflected by the reflection mirror 14 is optical path L2 in FIG. 3. By moving the reflection mirror 14 from the position P1 to the position P2 with respect to the X-direction, the optical path of the light reflected by the reflection mirror 14 is shifted from the optical path L1 to the optical path L2 in the X-direction. That is, by moving the reflection mirror 14 with respect to the X-direction, the optical path of the light traveling from the reflection mirror 14 to the SHG element 15 is shifted in the X-direction. Thereby, the optical path of the light entering the SHG element 15 is shifted with respect to the X-direction.

By shifting the optical path of the light entering the SHG element 15, the light can be entered into the position with the highest wavelength conversion efficiency within the optical crystal face. By entering the light into the position with the highest wavelength conversion efficiency, the laser light can be supplied with high efficiency because of the high wavelength conversion efficiency. Thereby, an effect that the laser light can be supplied with high efficiency is exerted because of the high wavelength conversion efficiency. The configuration that the optical path of the light is shifted by moving the reflection mirror 14 enables easy adjustment of the incident position of the light to the SHG element 15. After the respective members of the light source unit 10 are provided with usual working accuracy, the optical path of light can be easily adjusted to provide the highest wavelength conversion efficiency.

The reflection mirror 14 is not limited to be movable with respect to the X-direction, but may be movable with respect to Y-direction perpendicular to the X-direction. The Y-direction is a direction in which the light entering the SHG element 15 from the reflection mirror 14 travels. Also, the optical path of light entering the SHG element 15 can be shifted with respect to the X-direction in the case where the reflection mirror 14 is moved with respect to the Y-direction.

Figure 4:
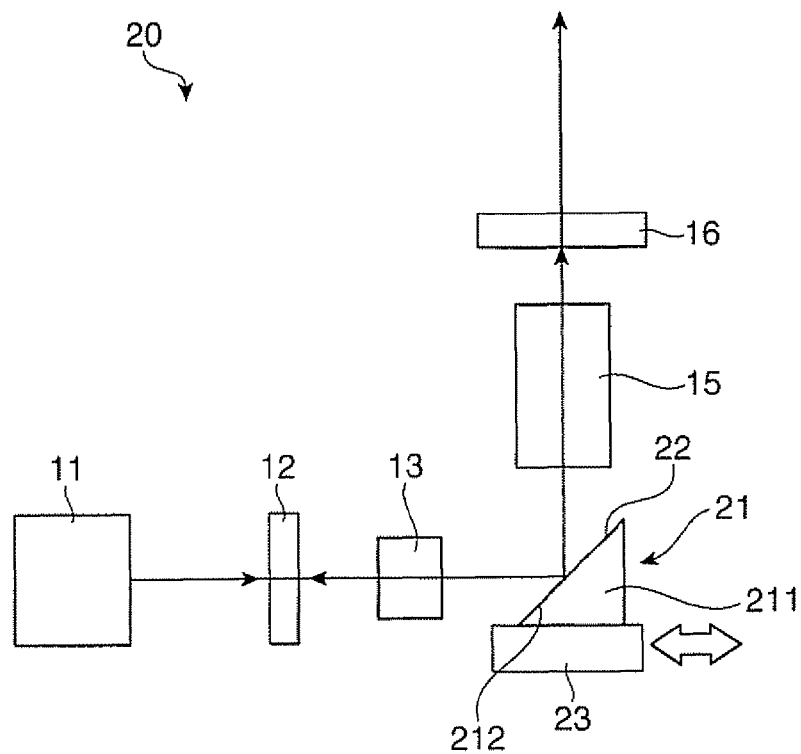
FIG. 4 shows a schematic configuration of a light source unit according to modified example 1 of the embodiment 1.

FIG. 4 shows a schematic configuration of a light source unit 20 according to modified example 1 of the embodiment. The light source unit 20 of the modified example has a triangular prism 21. The triangular prism 21 has bottom faces 211 having right isosceles triangle shapes and three side faces orthogonal to the bottom faces 211, and a reflection film 22 formed on one side face 212. The side face 212 with the reflection film 22 provided thereon is a side face containing the hypotenuses of the right isosceles triangles of the bottom faces 211. The triangular prism 21 is an optical element that reflects the light from the semiconductor element 11 on the reflection film 22, and bends the optical path of the light nearly at a right angle to change the optical path of the light from the light source part. When the triangular prism 21 having the reflection film 22 is used, the optical path of light from the semiconductor element 11 can be shifted as is the case of using the above described reflection mirror 14 (see FIG. 3).

The triangular prism 21 is provided on a mount 23. The mount 23 is a flat plate member. The triangular prism 21 may be moved together with the mount 23. Using the triangular prism 21 that can be stably provided on the mount 23, the optical path of light from the semiconductor element 11 can be easily shifted with high accuracy.

Figure 5:
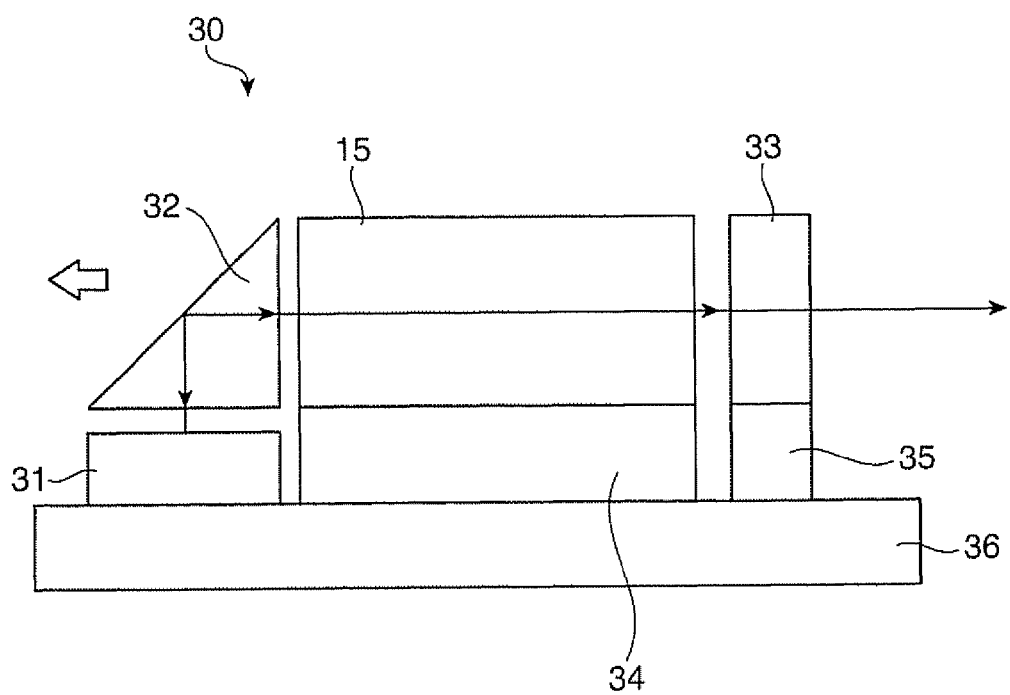
FIG. 5 shows a schematic configuration of a light source unit according to modified example 2 of the embodiment 1.

FIG. 5 shows a schematic configuration of a light source unit 30 according to modified example 2 of the embodiment. The light source unit 30 has a surface emitting semiconductor element 31. A triangular prism 32 is provided in a position facing the semiconductor element 31. The triangular prism 32 is a prism having a section of right isosceles triangle. The light entering the triangular prism 32 travels within the triangular prism 32, and then, is totally reflected on a slope of the triangular prism 32. The triangular prism 32 is a prism that totally reflects the light on the slope. The triangular prism 32 is an optical element that reflects the light from the semiconductor element 31, and bends the optical path of the light nearly at a right angle to change the optical path of the light from the semiconductor element 31.

The light totally reflected by the triangular prism 32 and then output from the triangular prism 32 enters the SHG element 15. The SHG element 15 is provided on a mount 34. An external resonator 33 is provided at the opposite side to the triangular prism 32 with respect to the SHG element 15. The external resonator 33 is provided on a mount 35. The mounts 34, are flat plate members. The semiconductor element 31 and the mounts 34, 35 are provided on a substrate 36. Using the mounts 34, 35, the positions of the SHG element 15 and the external resonator 33 relative to the substrate 36 can be appropriately determined. Further, the temperature control of the SHG element 15 may be performed using the configuration provided on the mount 34.

The mounts 34, 35 may be omitted as long as the light from the triangular prism 32 can be entered into the SHG element 15 and the external resonator 33. In this case, the temperature control of the SHG element 15 may be performed using the configuration provided on the substrate 36. By providing the triangular prism 32 in the resonator formed by the semiconductor element 31 and the external resonator 33, the triangular prism 32, the SHG element 15, and the external resonator 33 can be provided in the same plane. Therefore, after they are provided with usual working accuracy, the optical path of laser light can be easily adjusted to provide the highest wavelength conversion efficiency.

The external resonator 33 has a function of selectively reflecting light at 1064 nm, for example, and transmitting lights at other wavelengths. The light converted by the SHG element 15 at a specific wavelength, for example, 532 nm passes through the external resonator 33 and exits from the light source unit 30. The light at wavelength, for example, 1064 nm other than the specific wavelength are reflected by the external resonator 33. The light reflected by the external resonator 33 enters the semiconductor element 31 through the SHG element 15 and the triangular prism 32. A reflection mirror (not shown) provided in the semiconductor element 31 reflects the light that has been reflected by the external resonator 33 and returned to the semiconductor element 31. The external resonator 33 reflects lights at wavelengths other than the specific wavelength for resonation between the semiconductor element 31 and itself. The light source unit 30 resonates the light between the reflection mirror and the external resonator 33 to amplify the light. When the triangular prism 32 that totally reflects the light is used, the optical path of the light from the semiconductor element 31 can be shifted as is the case of using the above described reflection mirror 14 (see FIG. 3).

Figure 6:
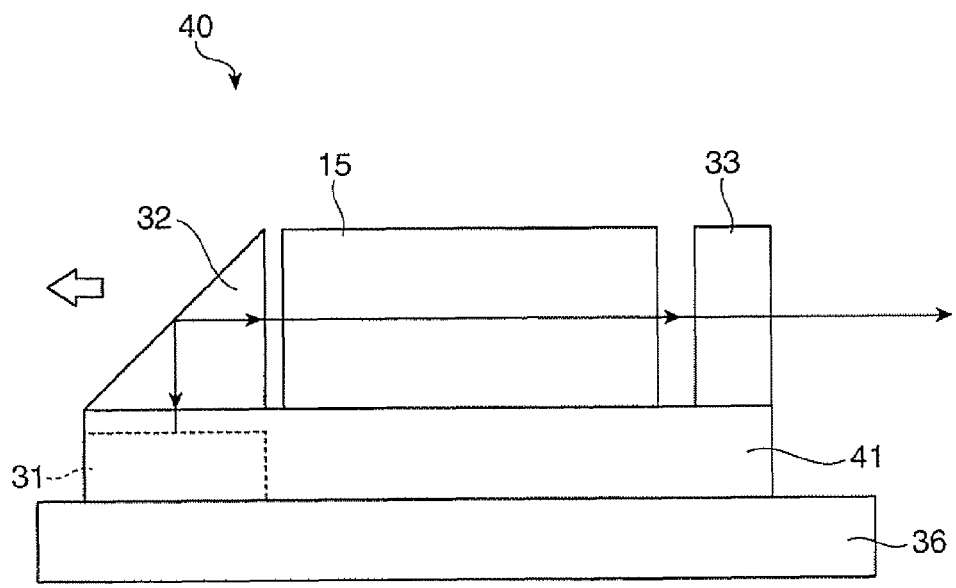
FIG. 6 shows a schematic configuration of a light source unit according to modified example 3 of the embodiment 1.

FIG. 6 shows a schematic configuration of a light source unit 40 according to modified example 3 of the embodiment. The light source unit 40 of the modified example is characterized in that the triangular prism 32, the SHG element 15, and the external resonator 33 are provided on a same mount 41. The mount 41 is a flat plate member, and has a notch corresponding to the part in which the semiconductor element 31 is provided and the part through which the light output from the semiconductor element 31 passes. The semiconductor element 31 and the mount 41 are provided on the substrate 36.

All of the triangular prism 32, the SHG element 15, and the external resonator 33 are moved together with the mount 41. Using the mount 41, the SHG element 15 and the external resonator 33 are moved in conjunction with the movement of the triangular prism 32. The triangular prism 32, the SHG element 15, and the external resonator 33 are movable relative to the substrate 36, while the semiconductor element 31 is fixed onto the substrate 36.

Figure 7:
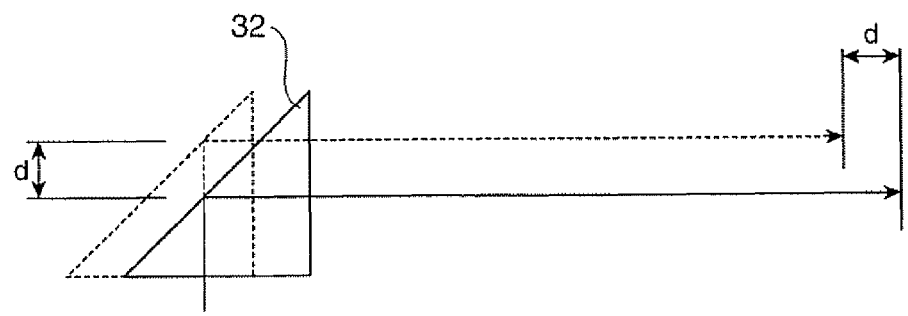
FIG. 7 is a diagram for explanation of a relationship between the movement of a triangular prism and an optical path length.

FIG. 7 is a diagram for explanation of a relationship between the movement of the triangular prism 32 and the optical path length. Hypothetically, the case where the SHG element 15 and the external resonator 33 (see FIG. 6) are fixed but only the triangular prism 32 is moved relative to the semiconductor element 31 is considered. When the triangular prism 32 is moved from the state shown by a solid line to the state shown by a broken liner the optical path length between the semiconductor element 31 and the external resonator 33 is changed by length d. Since there is the optimal optical path length for resonation of light, if the optical path length between the semiconductor element 31 and the external resonator 33 changes, realization of the high wavelength conversion efficiency becomes difficult.

When the SHG element 15 and the external resonator 33 are moved in conjunction with the movement of the triangular prism 32, the external resonator 33 is moved toward the semiconductor element 31 by the length d. Accordingly, even when the optical path of the light from the semiconductor element 31 is shifted by moving the triangular prism 32, the SHG element 15 and the external resonator 33 are moved in conjunction with the movement of the triangular prism 32 and the optical path length between the semiconductor element 31 and the external resonator 33 is unchanged. Therefore, by moving the external resonator 33 in conjunction with the triangular prism 32, the optical path length between the semiconductor element 31 and the external resonator 33 can be kept unchanged and the optical path of the light from the semiconductor element 31 can be shifted. Thereby, the reduction in wavelength conversion efficiency can be suppressed and the light from the semiconductor element 31 can be shifted.

Figure 8:
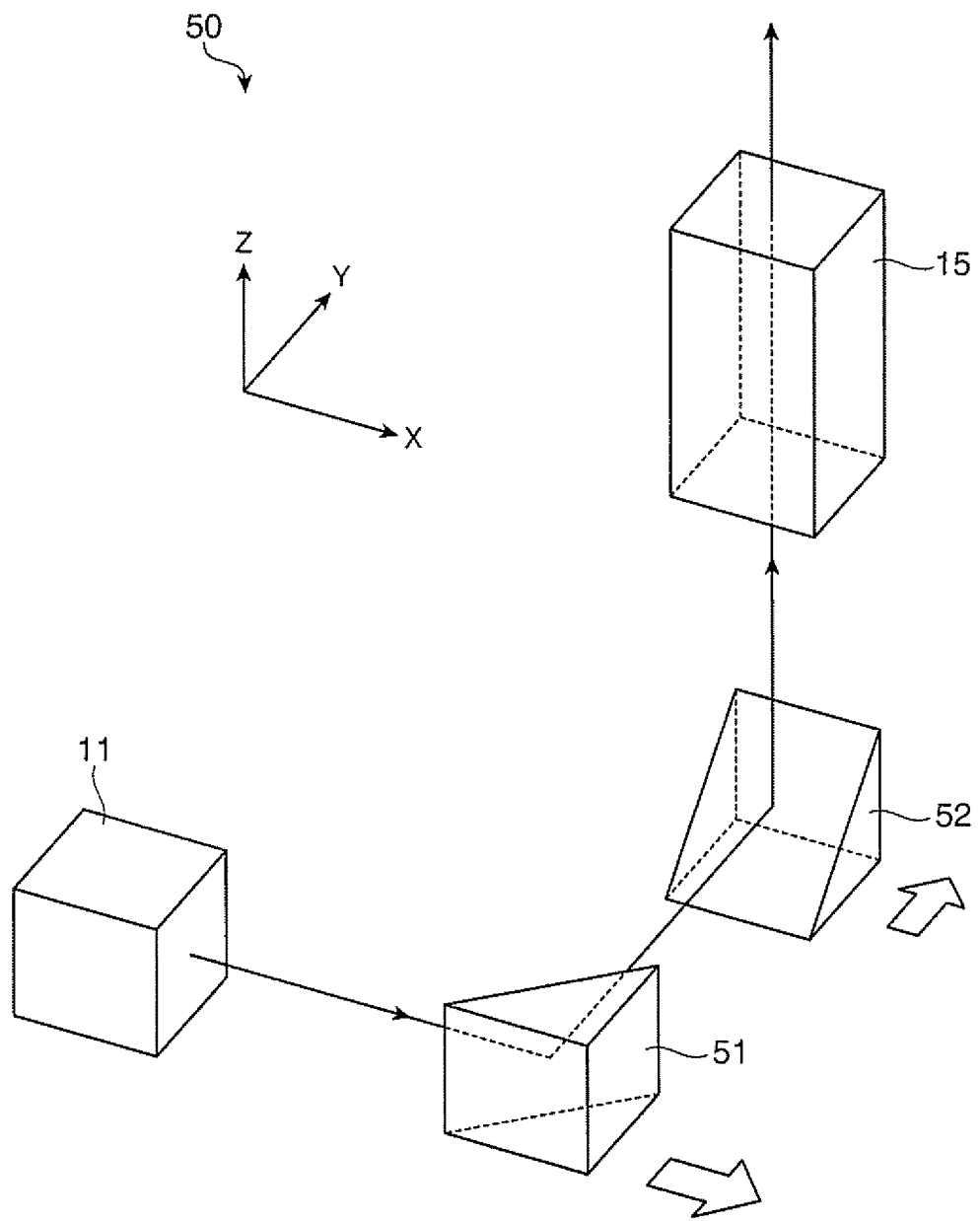
FIG. 8 shows a schematic configuration of a light source unit according to modified example 4 of the embodiment 1.

FIG. 8 shows a schematic configuration of a light source unit 50 according to modified example 4 of the embodiment. The light source unit 50 of the modified example is characterized in that the light from the semiconductor element 11 can be shifted with respect to the X-direction and the Y-direction. The X-direction is the first direction and the Y-direction is the second direction nearly perpendicular to the first direction. The Z-direction is a direction nearly perpendicular to the X-direction and the Y-direction. In the modified example, the illustration of the first resonant mirror 12, the laser crystal 13, and the second resonant mirror 16 is omitted.

Both a first triangular prism 51 and a second triangular prism 52 are prisms having the same configuration as that of the triangular prism 21 (see FIG. 4) in the above described modified example 1, and optical elements that reflect lights by reflection films. The first triangular prism 51 as the first optical element bends the optical path of the laser light traveling from the semiconductor element 11 side in the X-direction toward the Y-direction. The second triangular prism 52 as the second optical element bends the optical path of the laser light traveling from the first triangular prism 51 in the Y-direction toward the Z-direction. The SHG element 15 is provided so that the face into which the light from the second triangular prism 52 enters is provided along the X-direction and the Y-direction.

The first triangular prism 51 is configured to be movable with respect to the X-direction. By moving the first triangular prism 51 with respect to the X-direction, the optical path of the light entering the SHG element 15 is shifted with respect to the X-direction. The second triangular prism 52 is configured to be movable with respect to the Y-direction. By moving the second triangular prism 52 with respect to the Y-direction, the optical path of the light entering the SHG element 15 is shifted with respect to the Y-direction. Thereby, the light can be entered into the position where the highest wavelength conversion efficiency is provided within the plane along the first direction and the second direction. A prism as an optical element is not limited to the triangular prism as long as it can change the optical path of the light from the semiconductor element 11. The prism may be a polyangular prism that changes the optical path of the laser light by the reflection on the reflection film and total reflection on the interface, or non-angular prism.

Embodiment 2

Figure 9:
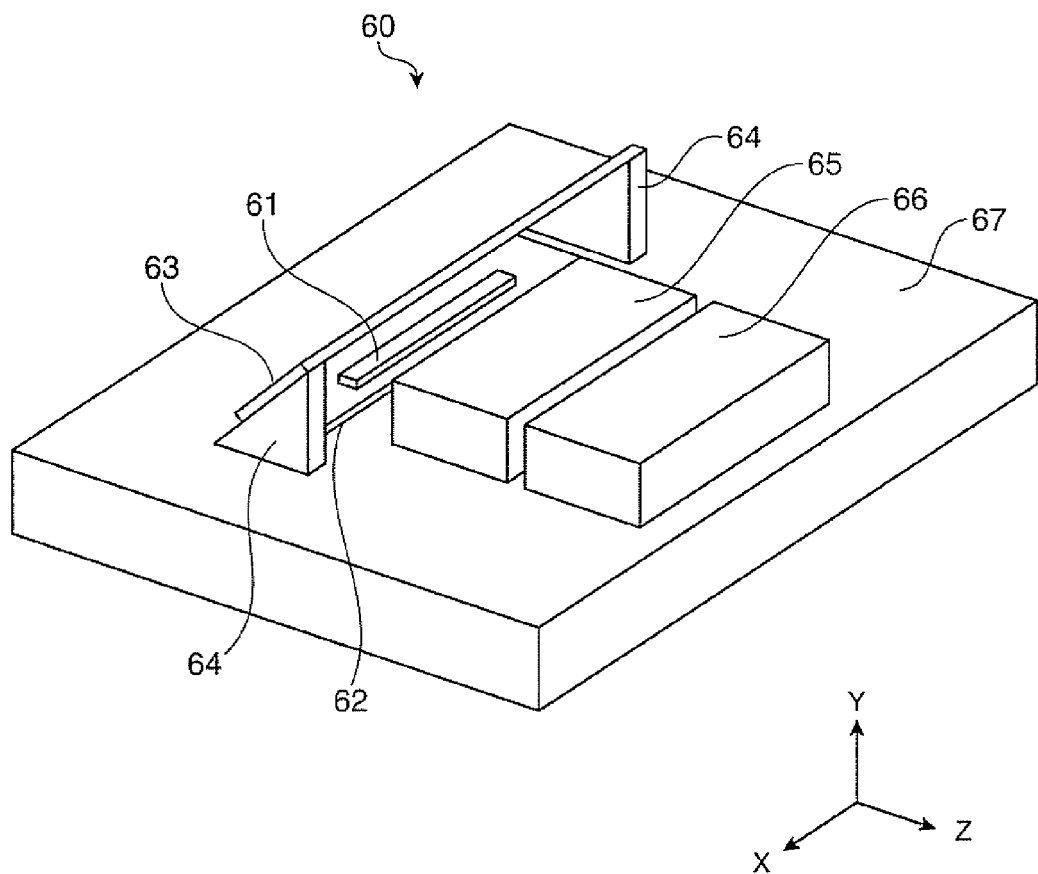
FIG. 9 shows a configuration of a light source unit in a perspective view according to embodiment 2 of the invention.
Figure 10:
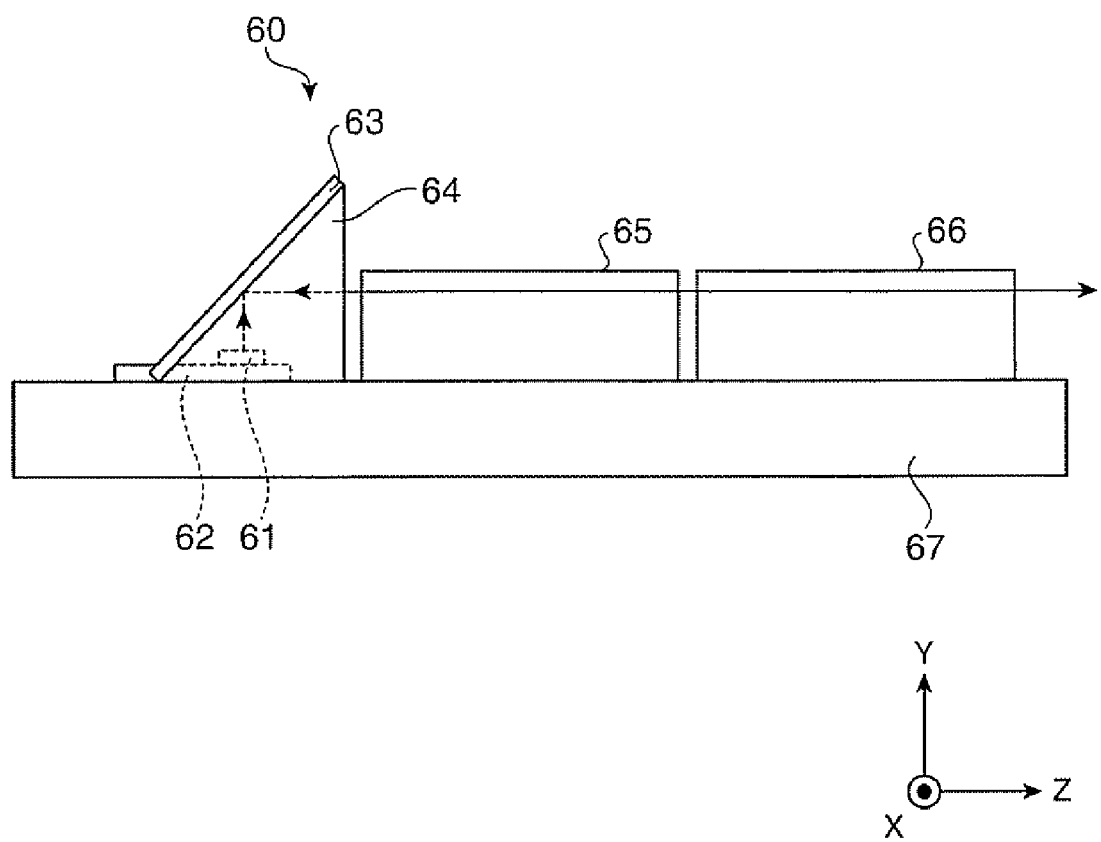
FIG. 10 shows the configuration of the light source unit shown in FIG. 9 in a side view.

FIG. 9 shows a configuration of a light source unit 60 in a perspective view according to embodiment 2 of the invention. FIG. 10 shows the configuration of the light source unit 60 shown in FIG. 9 in a side view. A semiconductor element 61 is a light source part that outputs fundamental wave light at the first wavelength. The semiconductor element 61 is a surface emitting array light source that outputs plural lights. The fundamental wave light is infrared light, for example. The first wavelength is 1064 nm, for example. The semiconductor element 61 is mounted on a submount 62. The submount 62 is a radiator plate that diffuses heat generated at the semiconductor element 61.

A reflection mirror 63 is provided in a position where the light from the semiconductor element 61 enters. The reflection mirror 63 is an optical element that changes the optical path of the light from the semiconductor element 61. The reflection mirror 63 includes a dielectric multilayer film that reflects infrared light, for example. The reflection mirror 63 is provided on two mirror supports 64 with the semiconductor element 61 provided in between. The mirror supports 64 are an optical element supporting part that supports the reflection mirror 63. The mirror support 64 has a side configuration in a right triangle shape. The reflection mirror 63 is provided on the mirror supports 64 to be inclined to nearly 45° relative to the Y-axis and the Z-axis.

The submount 62, the mirror supports 64, an SHG element 65, and an external resonator 66 are provided on a substrate 67. The reflection mirror 63, the SHG element 65, and the external resonator 66 are arranged in a line along the Z-axis direction. The Y-axis is an axis perpendicular to the Z-axis. The X-axis is an axis perpendicular to the Z-axis and the Y-axis. The SHG element 65 is a wavelength conversion element that wavelength-converts the fundamental wave light at the first wavelength from the semiconductor element 61 and outputs harmonic wave light at the second wavelength. The harmonic wave light is visible light, for example. The second wavelength is a half of the first wavelength, 532 nm, for example. The SHG element 65 has a rectangular parallelepiped shape.

The external resonator 66 is an external resonator that resonates the light from the semiconductor element 61 between the semiconductor element 61 and itself. The external resonator 66 selectively reflects the light at the first wavelength and transmits the lights at other wavelengths (including the second wavelength) than the first wavelength. As the external resonator 66, for example, a volume hologram may be used. As the volume hologram, for example, VHG (Volume Holographic Grating) may be used. The VHG is formed by a photorefractive crystal such as $LiNbO_3$ or BGO, polymer or the like. In the volume hologram, a fringe pattern produced by incident lights entered from two directions is recorded. The fringe pattern is recorded as a periodic structure in which high-refractive-index portions and low-refractive-index portions are periodically arranged. The volume hologram selectively reflects only the light matching with the fringe pattern in Bragg condition by diffraction. Also, in the case of the embodiment, the SHG element 65 and the external resonator 66 may be provided on a mount.

The light from the semiconductor element 61 travels in the Y-axis direction and enters the reflection mirror 63. The optical path of the light entering the reflection mirror 63 from the semiconductor element 61 is bent in the Z-axis direction, and then, the light enters the SHG element 65. The light transmitted through the SHG element 65 enters the external resonator 66. The harmonic wave light entering the external resonator 66 is transmitted through the external resonator 66 and exits to the outside of the light source unit 60. The fundamental wave light entering the external resonator 66 is reflected by the external resonator 66 and enters the SHG element 65. The optical path of the fundamental wave light entering the reflection mirror 63 from the SHG element 65 is bent through the reflection by the reflection mirror 63, and then, the light enters the semiconductor element 61.

Figure 11:
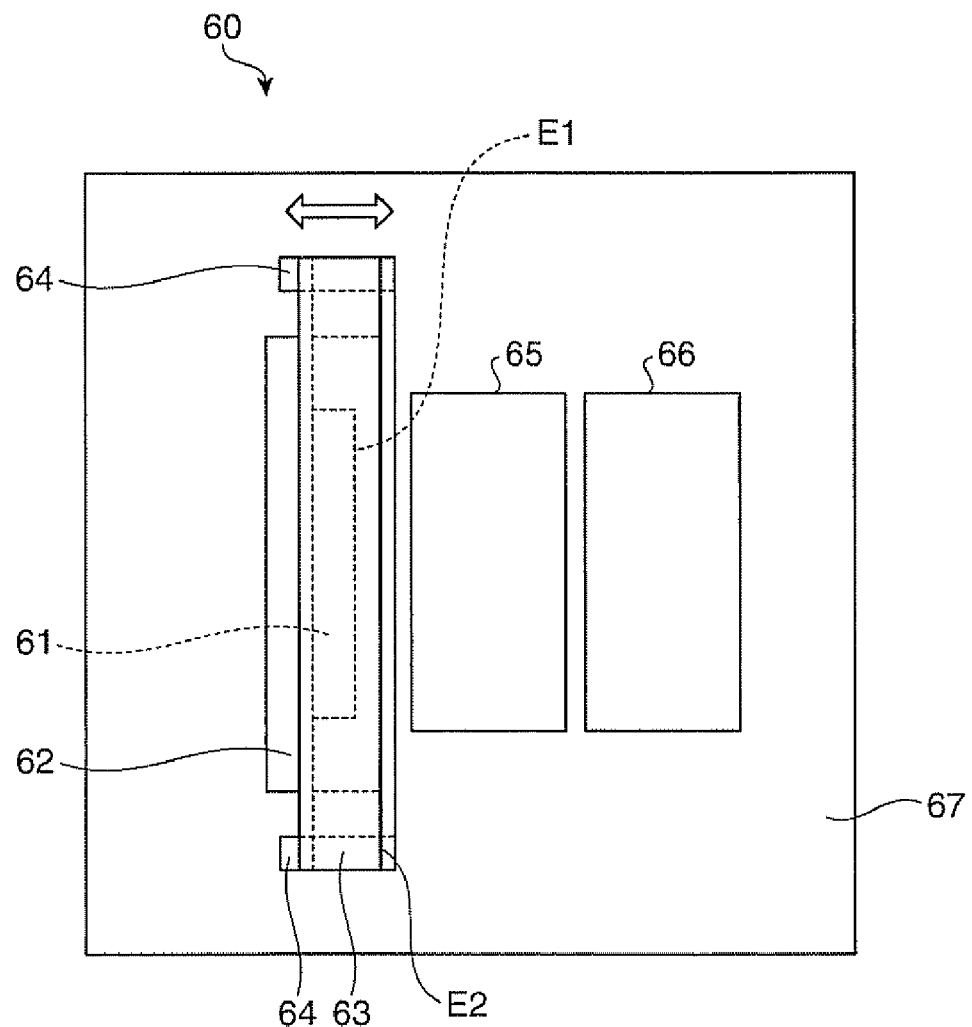
FIG. 11 shows the configuration of the light source unit shown in FIG. 9 in a top view.
Figure 11:
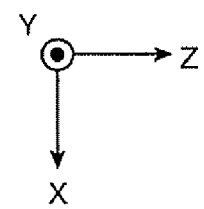

FIG. 11 shows the light source unit 60 in a top view. The semiconductor element 61 has an elongated reed shape in the X-axis direction relative to the Z-axis direction. The edge E1 corresponding to the long side of the reed shape of the semiconductor element 61 is nearly in parallel with the X-axis. In the manufacturing process of the light source unit 60, the mirror supports 64 are moved in the Z-axis direction on the substrate 67. By moving the reflection mirror 63 together with the mirror supports 64, the optical path of the light from the semiconductor element 61 to be entered into the SHG element 65 is shifted. The position adjustment of the reflection mirror 63 via the mirror supports 64 can be performed, and thus, the position of the reflection mirror 63 can be adjusted easily.

Here, the mirror supports 64 move while maintaining the parallel relationship between the edge E2 of the reflection mirror 63 and the edge E1 of the semiconductor element 61. Whether the edge E2 of the reflection mirror 63 and the edge E1 of the semiconductor element 61 are in parallel or not may be confirmed using image recognition by a monitor or the like, for example. By keeping the parallelism of the reflection mirror 63 and the semiconductor element 61, the optical path of the light to be entered into the SHG element 65 can be shifted while the resonance state in the semiconductor element 61 and the external resonator 66 is kept. Further, by measuring the distance between both edges E1 and E2, the incident position of the light in the SHG element 65 can be estimated. Thereby, the configuration in which the light from the semiconductor element 61 is entered into the position having high wavelength efficiency in the SHG element 65 can be realized. When the reflection mirror 63 that reflects infrared light and transmits visible light is used, as shown in FIG. 11, the semiconductor element 61 can be recognized through the reflection mirror 63. In this case, the parallelism of the reflection mirror 63 and the semiconductor element 61 can be easily confirmed.

The light source unit 60 of the embodiment may use a triangular prism that has been described in the above embodiment 1 in place of the reflection mirror 63. Further, the mirror supports 64, the SHG element 65, and the external resonator 66 may be provided on the same mount and the SHG element 65 and the external resonator 66 may be movable in conjunction with the movement of the reflection mirror 63.

Figure 12:
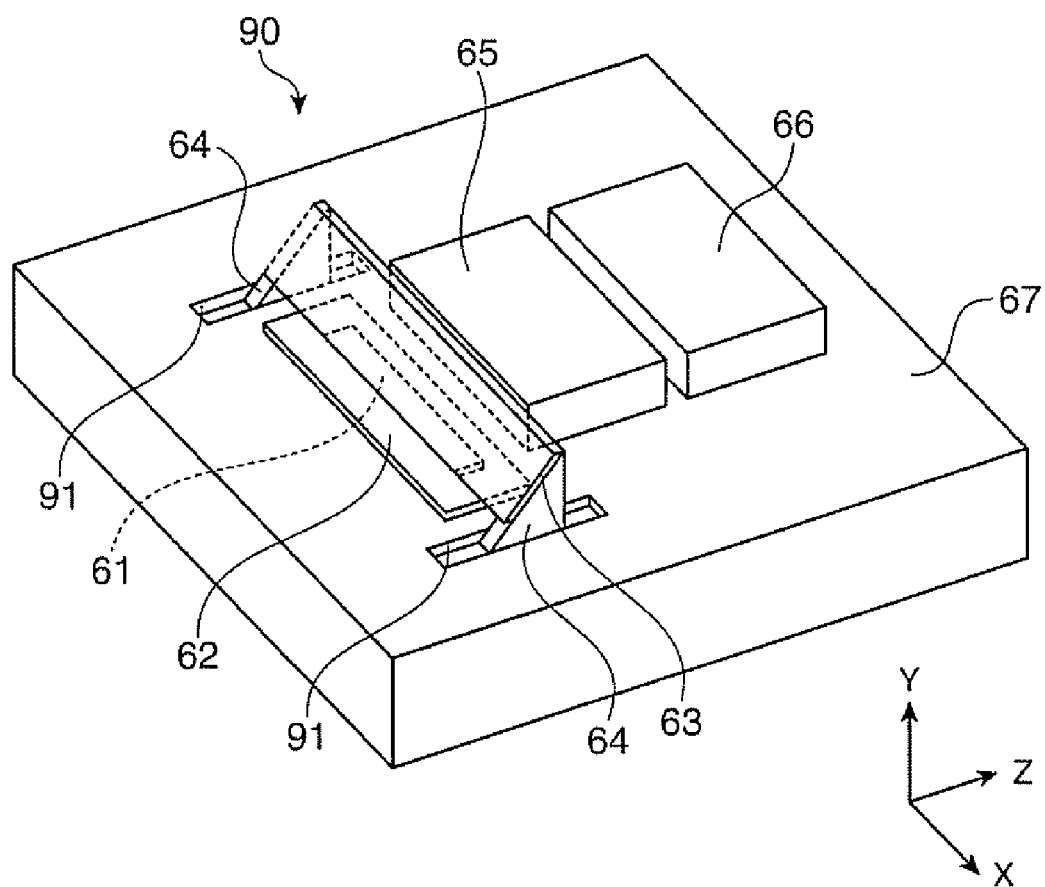
FIG. 12 shows a configuration of a light source unit in a perspective view according to the modified example 1 of the embodiment 2.

FIG. 12 shows a configuration of a light source unit 90 in a perspective view according to the modified example 1 of the embodiment. The light source unit 90 in the modified example is characterized to have two guides 91 provided on the substrate 67. The guide 91 is a groove formed in the substrate 67. The guides 91 are provided in parts of the substrate 67, in which the mirror supports 64 are provided. The mirror supports 64 are inserted into the guides 91. The guides 91 have recessed shapes into which the mirror supports 64 are inserted. The two guides 91 are formed in parallel with each other. Both two guides 91 have elongated shapes in the Z-axis direction relative to the X-axis direction.

The width of the guide 91 in the X-axis direction is nearly equal to the width of the mirror support 64 in the X-axis direction. The mirror support 64 is restricted in movement in the X-axis direction by the guide 91. The width of the guide 91 in the Z-axis direction is larger than the width of the mirror support 64 in the Z-axis direction. In the manufacturing process of the light source unit 90, the mirror supports 64 are moved inside the guides 91 in the Z-axis direction. Thus, using the guides 91, the mirror supports 64 can be guided in the Z-axis direction. By the guidance of the mirror supports 64 using the guides 91, the reflection mirror 63 can be moved easily while reliably keeping the parallelism of the reflection mirror 63 and the semiconductor element 61.

Figure 13:
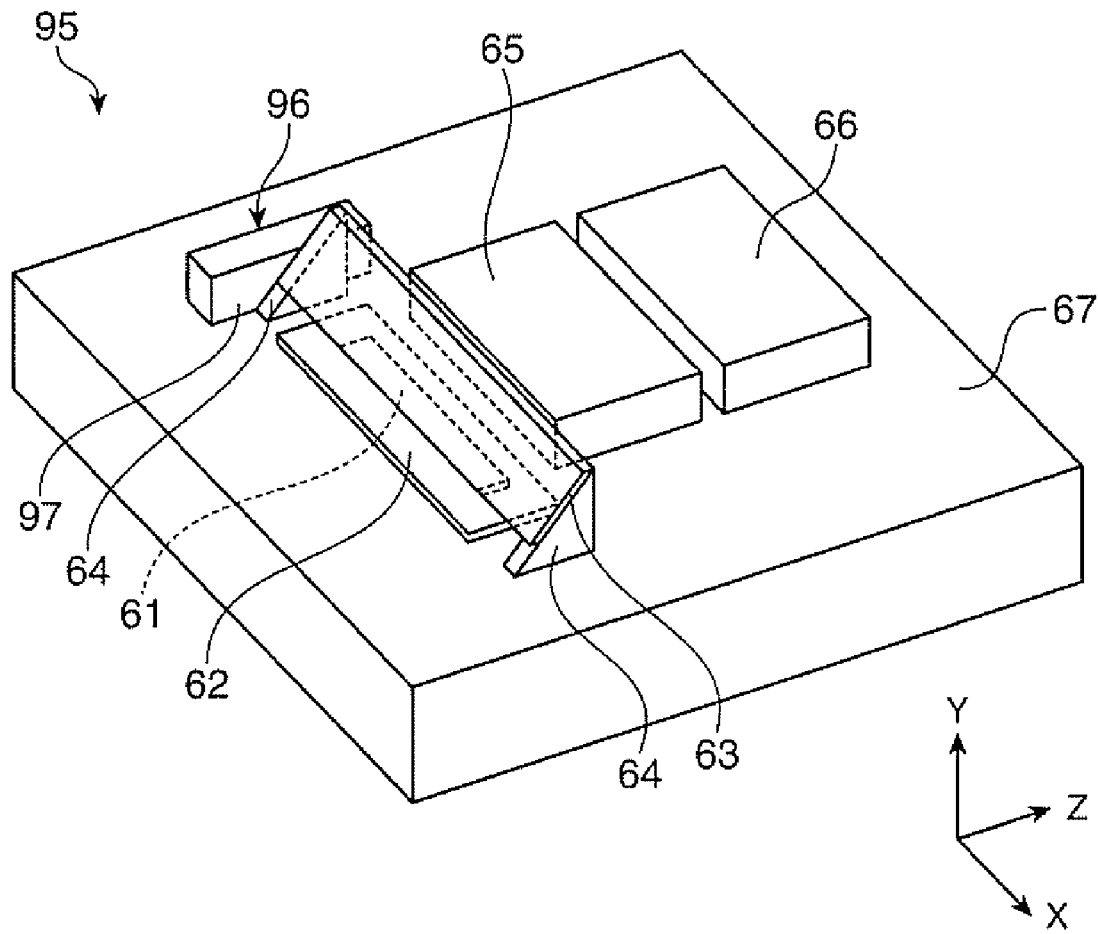
FIG. 13 shows a configuration of a light source unit in a perspective view according to the modified example 2 of the embodiment 2.

FIG. 13 shows a configuration of a light source unit 95 in a perspective view according to the modified example 2 of the embodiment. The light source unit 95 in the modified example is characterized to have a guide 96 in a projecting shape. The guide 96 is provided on the substrate 67. The guide 96 has a parallelepiped shape. The guide 96 has a contact surface 97 nearly in parallel with the Z-axis direction. The guide 96 is provided in a position in which the contact surface 97 can be brought into contact with one of the two mirror supports 64. Thus, the guide 96 includes a projecting shape that can be brought into contact with the mirror support 64.

In the manufacturing process of the light source unit 95, the mirror supports 64 are moved in the Z-axis direction while the contact surface 97 in contact with the mirror support 64 is held. Thus, using the guide 96, the mirror supports 64 can be guided in the Z-axis direction. Also, in the modified example, by the guidance of the mirror supports 64 using the guide 96, the reflection mirror 63 can be moved easily while reliably keeping the parallelism of the reflection mirror 63 and the semiconductor element 61. The light source unit 95 may have two guides 96 provided for the two mirror supports 64. Further, the shapes of the guides 91, 96 are not limited to the shapes that have been described in the embodiment as long as they can guide the mirror supports 64 in the Z-axis direction.

Embodiment 3

Figure 14:
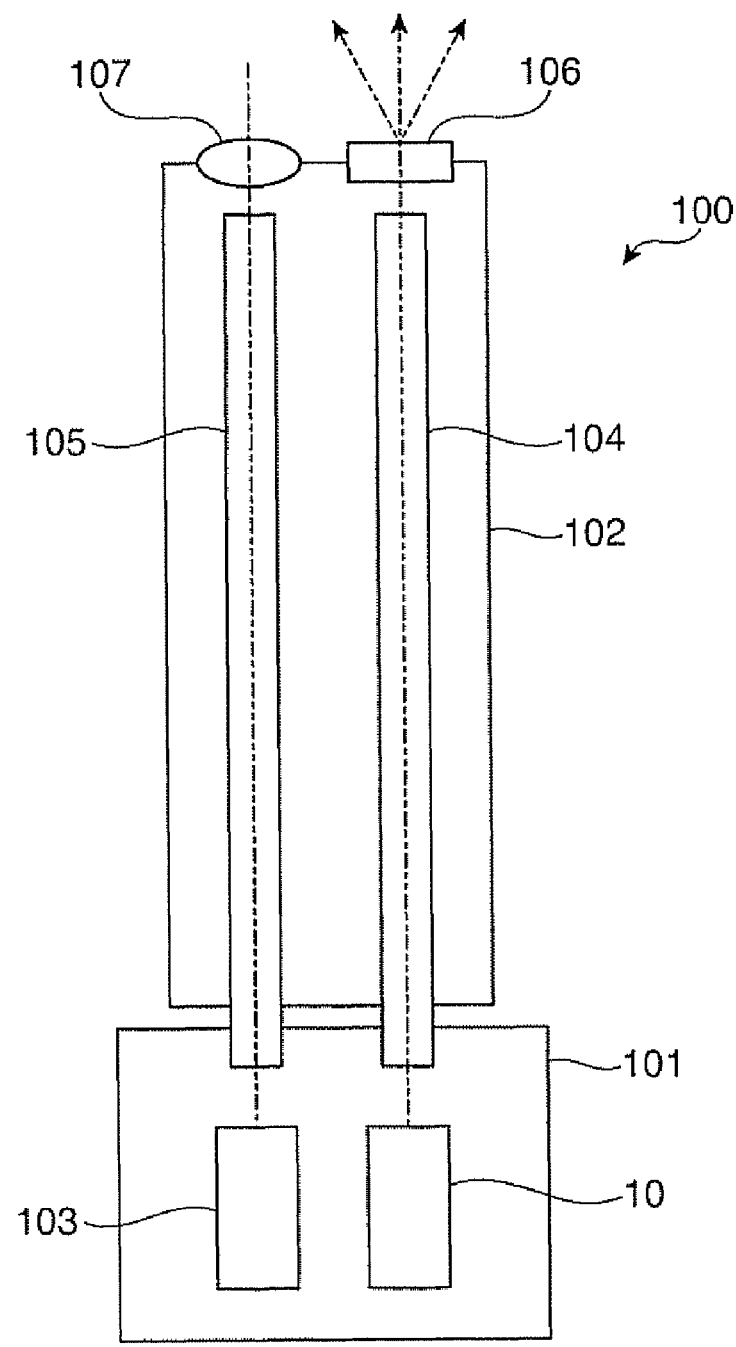
FIG. 14 shows a schematic configuration of a monitor apparatus according to embodiment 3 of the invention.

FIG. 14 shows a schematic configuration of a monitor apparatus 100 according to embodiment 3 of the invention. The monitor apparatus 100 has an apparatus main body 101 and a light transmission unit 102. The apparatus main body 101 includes the light source unit 10 (see FIG. 1) of the above described embodiment 1. The light transmission unit 102 has two light guides 104, 105. A diffusing plate 106 and an imaging lens 107 are provided at the end of the subject (not shown) side of the light transmission unit 102. The first light guide 104 transmits the light from the light source unit 10 to the subject. The diffusing plate 106 is provided at the exit side of the first light guide 104. The light propagating within the first light guide 104 is transmitted through the diffusing plate 106 to be diffused at the subject side. The respective parts in the optical path from the light source unit 10 to the diffusing plate 106 configure an illumination device that illuminates the subject.

The second light guide 105 transmits the light from the subject to a camera 103. The imaging lens 107 is provided at the incident side of the second light guide 105. The imaging lens 107 condenses the light from the subject to the incident side surface of the second light guide 105. The light from the subject enters the second light guide 105 by the imaging lens 107, and then, propagates within the second light guide 105 and enters the camera 103.

As the first light guide 104, the second light guide 105, light guides formed by bundling a number of optical fibers may be used. Using the optical fibers, the light can be transmitted in the distance. The camera 103 is provided within the apparatus main body 101. The camera 103 is an imaging unit that images the subject illuminated by the light from the light source unit 10. The light entering from the second light guide 105 is entered into the camera 103, and thus, imaging of the subject by the camera 103 can be performed. Using the light source unit 10 of the above embodiment 1, the subject to be illuminated can be illuminated with high efficiency. Thereby, the effect that a bright image can be monitored using light supplied with high efficiency is exerted. The monitor apparatus 100 may use either of the light source units in the above embodiments.

Embodiment 4

Figure 15:
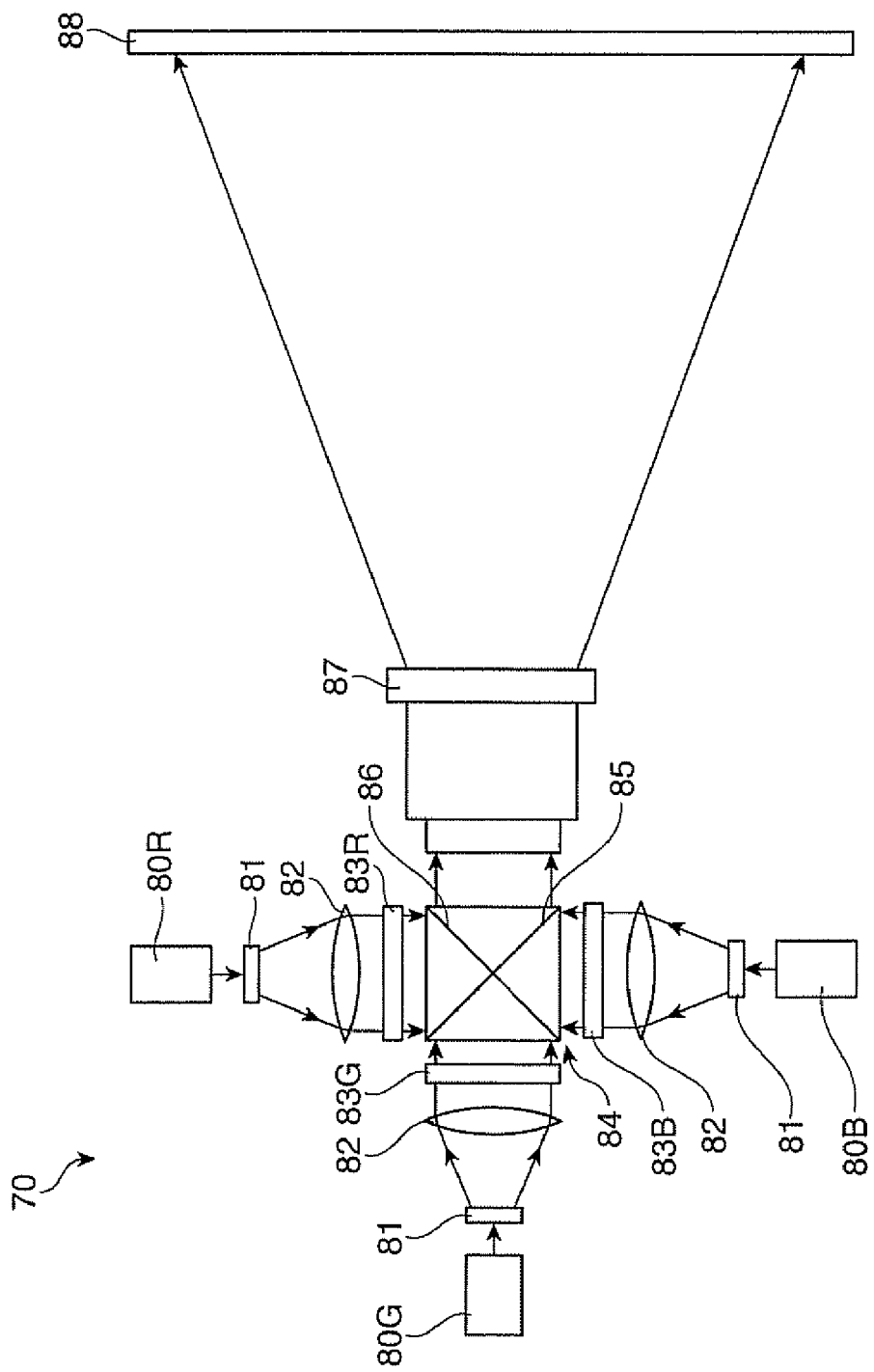
FIG. 15 shows a schematic configuration of a projector according to embodiment 4 of the invention.

FIG. 15 shows a schematic configuration of a projector 70 according to embodiment 4 of the invention. The projector 70 is a front-projection projector with which light is supplied to a screen 88 and an image is viewed by observation of the light reflected on the screen 88. The projector 70 has a light source unit 80R for red (R) light, a light source unit 80G for green (G) light, and a light source unit 80B for blue (B) light. All of the light source units 80R, 80G, 80B for the respective colors have the same configuration as that of the light source unit 10 (see FIG. 1) of the above embodiment 1. The overlapping description with the above embodiment 1 will be omitted. The projector 70 is an image display apparatus that displays images using lights from the light source units 80R, 80G, 80B for the respective colors.

The light source unit 80R for R light is a light source unit that supplies R light. A diffusing element 81 performs shaping and scaling up of the illuminated region and homogenizing the light amount distribution of laser light in the illuminated region. As the diffusing element 81, for example, a computer generated hologram (CGH) as a diffraction optical element may be used. A field lens 82 parallelizes the laser light from the diffusing element 81 and enters the light into a spatial light modulation unit 83R for R light. The light source unit 80R for R light, the diffusing element 81, and the field lens 82 configure an illumination device that illuminates the spatial light modulation unit 83R for R light. The spatial light modulation unit 83R for R light is a spatial light modulation unit that modulates the R light from the illumination device according to an image signal, a transmissive liquid crystal display unit. The R light modulated by the spatial light modulation unit 83R for R light enters a cross dichroic prism 84 as a light combining system.

The light source unit 80G for G light is a light source unit that supplies G light. The laser light through the diffusing element 81 and the field lens 82 enters a spatial light modulation unit 83G for G light. The light source unit 80G for G light, the diffusing element 81, and the field lens 82 configure an illumination device that illuminates the spatial light modulation unit 83G for G light. The spatial light modulation unit 83G for G light is a spatial light modulation unit that modulates the G light from the illumination device according to an image signal, a transmissive liquid crystal display unit. The G light modulated by the spatial light modulation unit 83G for G light enters the cross dichroic prism 84 from the side different from that of the R light.

The light source unit 80B for B light is a light source unit that supplies B light. The laser light through the diffusing element 81 and the field lens 82 enters a spatial light modulation unit 83B for B light. The light source unit 80B for B light, the diffusing element 81, and the field lens 82 configure an illumination device that illuminates the spatial light modulation unit 83B for B light. The spatial light modulation unit 83B for B light is a spatial light modulation unit that modulates the B light from the illumination device according to an image signal, a transmissive liquid crystal display unit. The B light modulated by the spatial light modulation unit 83B for B light enters the cross dichroic prism 84 from the side different from that of the R light or G light. As the transmissive liquid crystal display unit, for example, a high temperature polysilicon (HTPS) TFT liquid crystal panel may be used.

The cross dichroic prism 84 has two dichroic films 85, 86 disposed nearly orthogonally to each other. The first dichroic film 85 reflects R light and transmits G light and B light. The second dichroic film 86 reflects B light and transmits R light and G light. The cross dichroic prism 84 combines the R light, G light, and B light entering from the respective different directions, and outputs light toward a projection lens 87. The projection lens 87 projects the light combined by the cross dichroic prism 84 toward the screen 88.

Using the light source units 80R, 80G, 80B for the respective colors having the same configuration as that of the above light source unit 10, laser light in a stable amount can be supplied with high efficiency. Thereby, the effect that a bright image can be displayed using light supplied with high efficiency is exerted. The light source units 80R, 80G, 80B for the respective colors may have the same configuration as that of any one of the light source units in the above embodiments. The projector 70 is not limited to the case where all of the light source unit 80R for R light, the light source unit 80G for G light, and the light source unit 80B for B light have the same configuration as that of one of the light source units in the above embodiments. For example, the light source unit 80R for R light may output fundamental wave light from the light source part as it is without using the SHG element. The projector 70 is not limited to the case where the transmissive liquid crystal display unit is used as the spatial light modulation unit. As the spatial light modulation unit, a reflective liquid crystal display apparatus (Liquid Crystal On Silicon, LCOS), DMD (Digital Micro mirror Device), GLV (Grating Light Valve), or the like may be used.

The projector 70 is not limited to the configuration that includes spatial light modulation units for respective colors. The projector 70 may modulate two, three, or more color lights with one spatial light modulation unit. The projector 70 is not limited to the case of using a spatial light modulation unit. The projector 70 may be a laser scan projector that projects images on a projected screen by scanning laser light from the light source part with scanning means such as a galvano mirror. The projector may be a so-called rear projector with which light is supplied to one side of a screen and images are viewed by observation of the light output from the other side of the screen.

The light source unit according to the embodiments of the invention may be applied to a liquid crystal display as an image display apparatus. By combination of the light source unit according to the embodiments of the invention and a light guide plate, the unit may be used as an illumination device for illumination of the liquid crystal panel. Also, in this case, bright high quality images can be displayed. Furthermore, the light source unit according to the embodiments of the invention is not limited to the application to the image display apparatus and the monitor apparatus. For example, the light source unit may be used for an exposure apparatus for exposure using laser light or the like.

As described above, the light source unit according to the embodiments of the invention is suitable for use in an image display apparatus and a monitor apparatus.

The entire disclosure of Japanese Patent Application Nos: 2007-027649, filed Feb. 7, 2007 and 2007-276054, filed Oct. 24, 2007 are expressly incorporated by reference herein.

What is claimed is:

1. A light source unit comprising:
a light source part that supplies light and includes a semiconductor element and a laser crystal;
an optical element that changes an optical path of the light from the light source part, the optical element including a prism having a side face with a reflection film that reflects and changes the optical path of the light; and
a wavelength conversion element that converts a wavelength of the light from the optical element,
wherein the optical element is movable, and
the optical path of the light entering the wavelength conversion element from the optical element is shifted by moving the optical element.

2. The light source unit according to claim 1, wherein the optical element reflects the light from the light source part.

3. The light source unit according to claim 1, further comprising an external resonator that transmits light at a specific wavelength wavelength-converted by the wavelength conversion element, and reflects lights at wavelengths other than the specific wavelength and resonates the lights between the light source part and itself,
wherein the wavelength conversion element and the external resonator are provided movably in conjunction with the movement of the optical element.

4. The light source unit according to claim 3, wherein the wavelength conversion element and the external resonator are provided on the same member.

5. The light source unit according to claim 1, wherein the optical element includes a first optical element that shifts the optical path of the light from the light source part in the first direction, and a second that shifts the optical path of the light from the light source part in the second direction nearly perpendicular to the first direction.

6. The light source unit according to claim 1, further comprising an optical element support that supports the optical element.

7. The light source unit according to claim 6, further comprising a substrate on which the light source part, the optical element support, and the wavelength conversion element are provided,
wherein the substrate has a guide that guides the optical element support in a specific direction.

8. The light source unit according to claim 7, wherein the guide includes a recessed shape into which the optical element support can be inserted.

9. The light source unit according to claim 7, wherein the guide includes a parallelepiped shape that can be brought into contact with the optical element support.

10. An illumination device comprising the light source unit according to claim 1, wherein an illuminated subject is illuminated using light from the light source unit.

11. An image display apparatus comprising the light source unit according to claim 1, wherein an image is displayed using light from the light source unit.

12. A monitor apparatus comprising:
the illumination device according to claim 10; and
an imaging unit that images a subject illuminated by the illumination device.

13. A light source unit according to claim 1, wherein a resonant mirror is disposed between the semiconductor element and the laser crystal.

14. The light source unit according to claim 1, wherein the reflection film changes the optical path of the light at a right angle.

15. The light source unit according to claim 1, wherein the optical element is moveable in a direction in which the light enters the optical element from the light source part.

16. The light source unit according to claim 1, wherein the optical element is movable in a first direction in which the light enters the optical element from the light source part and a second direction substantially perpendicular to the first direction.

* * * * *